US008801281B1

(12) United States Patent
Chan et al.

(10) Patent No.: US 8,801,281 B1
(45) Date of Patent: Aug. 12, 2014

(54) ON-CHIP TEMPERATURE DETECTION USING AN OSCILLATOR

(75) Inventors: Ronny C. Chan, Shanghai (CN); Jenkin Wong, Shanghai (CN); Kirk Lau, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 71 days.

(21) Appl. No.: 13/480,383

(22) Filed: May 24, 2012

(51) Int. Cl.
*G01K 7/00* (2006.01)
*G06F 1/00* (2006.01)

(52) U.S. Cl.
USPC ............................ 374/163; 374/170; 713/300

(58) Field of Classification Search
CPC ............... G06F 1/06; H03J 7/10; G01K 7/01
USPC ........ 374/163, 170, 172; 377/25; 364/528.34; 702/99, 130; 713/300
See application file for complete search history.

(56) References Cited

U.S. PATENT DOCUMENTS

| | | |
|---|---|---|
| 3,996,451 A | 12/1976 | Harrington et al. |
| 4,164,147 A | 8/1979 | Kulwicki et al. |
| 5,899,570 A | 5/1999 | Darmawaskita et al. |
| 6,115,441 A * | 9/2000 | Douglass et al. ............... 377/25 |
| 7,583,555 B2 * | 9/2009 | Kang et al. ..................... 365/226 |
| 7,619,486 B1 * | 11/2009 | Lesea ............................. 331/176 |
| 7,831,873 B1 * | 11/2010 | Trimberger et al. .......... 714/725 |
| 2011/0101998 A1 * | 5/2011 | Myers et al. .................. 324/678 |

OTHER PUBLICATIONS

M. Raymond, M. Ghoneima and Y. Ismail, A Dynamic Power-Aware Process Variation Calibration Scheme, 2010 International Conference on Energy Aware Computing (ICEAC), Dec. 16-18, 2010, 3 Pages.

* cited by examiner

*Primary Examiner* — Lisa Caputo
*Assistant Examiner* — Nasir U Ahmed
(74) *Attorney, Agent, or Firm* — Marger Johnson & McCollom PC

(57) ABSTRACT

A temperature detection circuit on an integrated circuit has a temperature sensitive oscillator, at least one temperature insensitive oscillator, a reference clock, process detection circuitry coupled to an output of the temperature insensitive oscillator and the output of the reference clock, the process detection circuitry to compare the outputs and produce a process signal, and temperature reference circuitry coupled to an output of the temperature sensitive oscillator, the output of the reference clock, and the process signal, the temperature detection circuitry to produce a temperature for the integrated circuit.

13 Claims, 3 Drawing Sheets

ON-CHIP TEMPERATURE DETECTION USING AN OSCILLATOR

BACKGROUND

Having the process corner and operating temperature information can provide coarse calibration tuning for process corner and temperature sensitive circuits like delay lines. This will allow tighten design variation with the necessary compensation and enhance circuit and system performance.

The 'process corner' means the type of performance of the circuitry on the integrated circuit. Typically there are five process corners, Typical NMOS Typical PMOS (TT), Fast NMOS Fast PMOS (FF), Slow NMOS Slow PMOS (SS), Fast NMOS Slow PMOS (FNSP) and Slow NMOS Fast PMOS (SNFP). The fabrication process may vary during manufacture of an integrated circuit on a wafer, and the resulting circuit is classified according to its performance parameters, typically speed.

Generally, a semiconductor manufacturing facility, a foundry, will label the resulting circuit by its process corner. Chip designers who sent the design to the foundry find it useful to verify the actual process corner of the chips. Chips operating at higher speeds, such as FF, may allow for premium pricing. Additionally, the verification serves to verify the simulation and extraction models used at the foundry for the initial determination. For example, if a foundry marks several lots FF and they are actually FNSP, the models being used need to be changed. Another element of the verification is determination of the operating temperature of the integrated circuit.

Generally, designers want to limit power consumption and the presence of extraneous circuits and circuit elements on the chip. While being able to verify process corner and operating temperature provides advantages to the designers and sellers, the circuitry used should not consume much power or space on the chip.

DETAILED DESCRIPTION OF THE EMBODIMENTS

Figure 1:
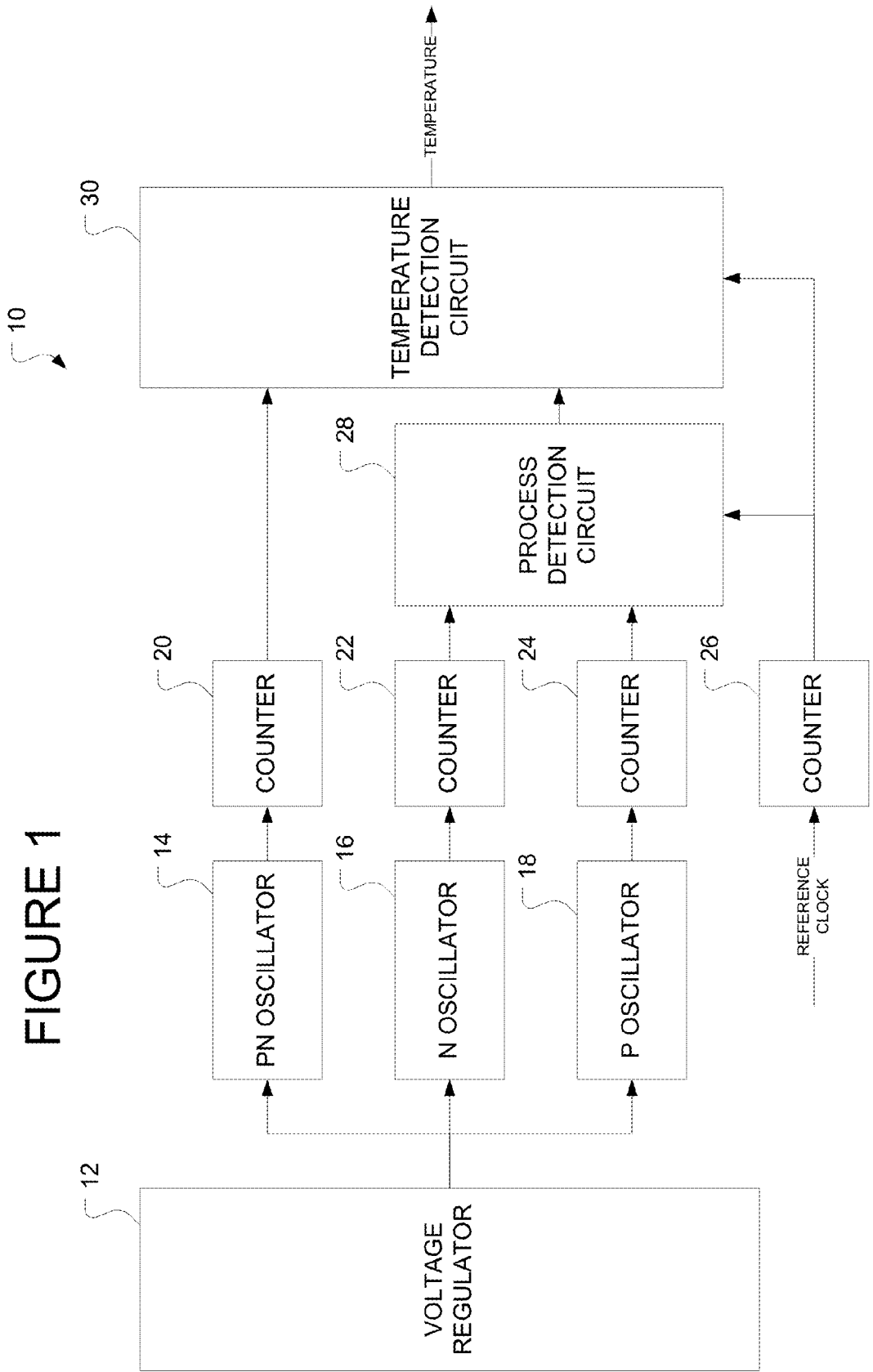
FIG. 1 shows an embodiment of an on-chip process and temperature detection circuit.

FIG. 1 shows an embodiment of an on-chip process and temperature detection circuit. The circuit may exist as one of several different variations. For example, the circuit can easily merge with an existing Power on Reset (POR) circuit. A typical POR circuit has a bandgap reference that may assist in regulator design for a voltage source that powers the detection circuit. Alternatively, the detection circuit may be placed in different sections of the chip to monitor process variation and temperature gradient.

As can be seen in FIG. 1, the detection circuit 10 has a fixed voltage supply for the oscillators. In this embodiment, the detection circuit uses a voltage regulator 12. The voltage levels are fairly low, in one embodiment the voltage regulator may provide a voltage supply of 1.1 V. This low of a voltage level may be possible if the oscillators are low power oscillators such as CMOS (complementary metal oxide semiconductor) oscillators.

The voltage regulator provides a fixed voltage supply to a set of oscillators. In the embodiment of FIG. 1, there are two temperature insensitive oscillators 16 and 18, and one temperature sensitive oscillator 14. Other combinations of temperature insensitive/sensitive oscillators may be possible. Typically, there will be a P oscillator and an N oscillator to determine the process corners for P and N. However, it is possible that future oscillators may be able to determine the process corner for both P and N. Only one temperature insensitive oscillator may be needed. In this embodiment, the temperature sensitive oscillator is a PN oscillator 14.

In order to determine the speed of the oscillator, a reference clock signal may be used. In order to determine the speed of the oscillators, their outputs are counted by counters 20, 22, 24 and 26. The process detection circuit 28 then receives these counts and compares the P and N counts to the reference clock to determine the free running frequency of the oscillators. Free running frequency versus process corner curves are simulated for the P and N oscillators and will reside in the process detection circuit 28, discussed in more detail later. In addition, free running frequency versus temperature curves for different process corners are generated for the PN oscillator and stored in the temperature detection circuit 30.

Figure 2:
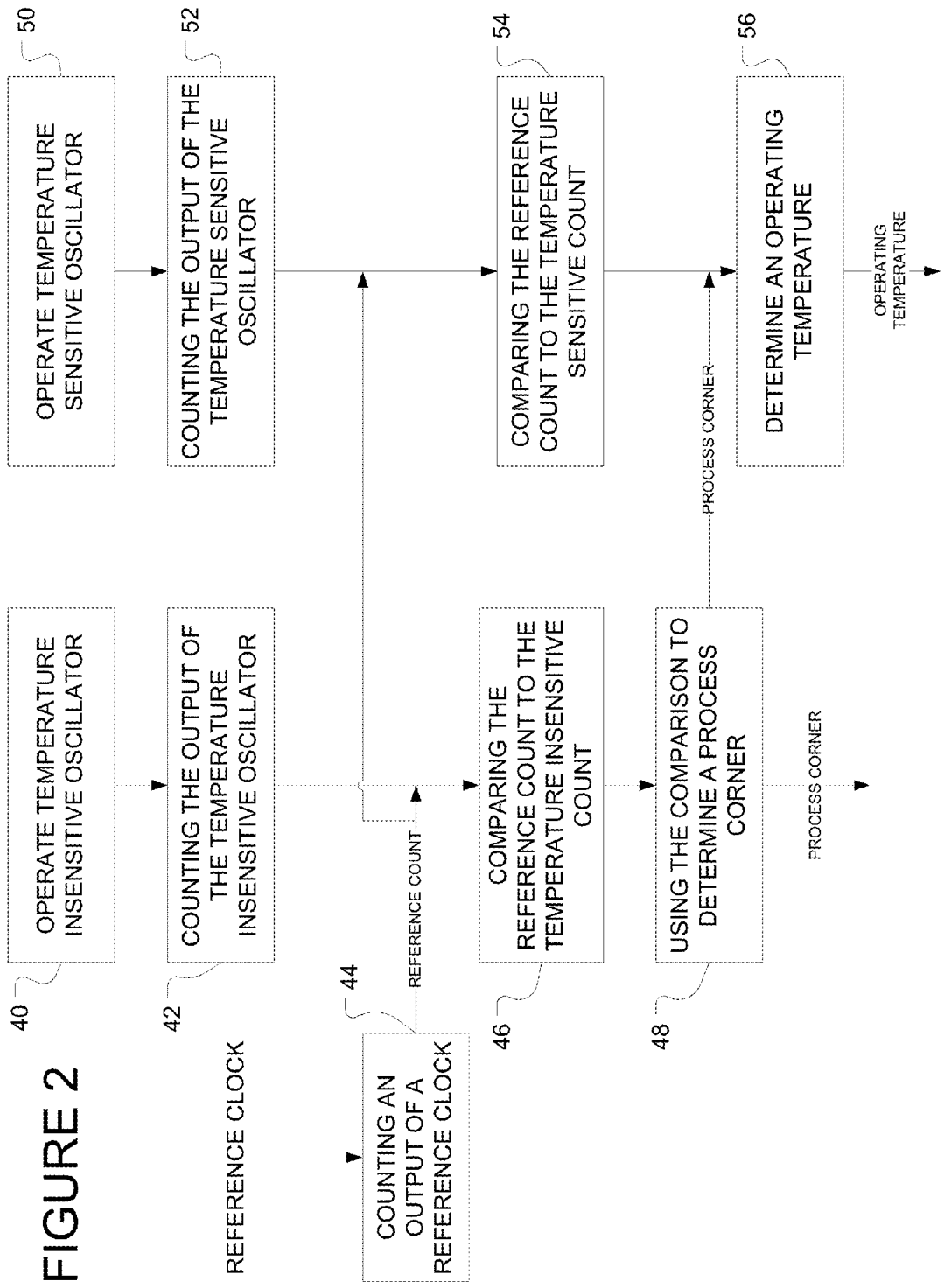
FIG. 2 shows a flowchart of an embodiment of a method to test processing circuits.

The operation of embodiments of the circuit may take many forms. FIG. 2 shows a flowchart of one such method of operation and the detection of the process corner and operating temperature of the integrated circuit being tested. In FIG. 2, the temperature insensitive oscillators such as the P oscillator 16 and the N oscillator 18 operate at a steady state. The output of the temperature insensitive oscillator is counted at 42. The reference clock is also counted at 44, simultaneously, external to the process, or otherwise.

At 46 the reference clock count is compared to the temperature insensitive oscillator(s) count. In one embodiment, the reference clock is counted over many cycles, such as a 10-bit counter. One experiment resulted in the free running output divided by 16 results shown in the following table.

|  | P Oscillator (MHz) | | | N Oscillator (MHz) | | |
| --- | --- | --- | --- | --- | --- | --- |
| Temp | −10 C. | 5 C. | 125 C. | −10 C. | 5 C. | 125 C. |
| TT | 10 | 0 | 11 | 10 | 10 | 10 |
| FF | 13 | 3 | 13 | 13 | 12 | 12 |
| SS | 8 | 8 | 9 | 9 | 9 | 9 |
| SNFP | 12 | 3 | 13 | 9 | 9 | 9 |
| FNSP | 8 | 8 | 9 | 12 | 12 | 12 |

In the table, the output clock is designed to have 1 MHz or less change from −10 C to 25 C. If the reference frequency is 24 MHz and the counter size is 10 bits (1024), the sampling time is 1/24 MHz*1024=42.666. Within this sampling time, the output from the P and N oscillators 16 and 18 can be determined by the following formula $$\frac{F_{OSC}}{F_{REF}} \times \text{Bits}_{COUNTER};$$

where $F_{osc}$ is the free running frequency of the P, N or PN oscillators, $F_{REF}$ is the reference frequency and the $\text{Bits}_{COUNTER}$ is the counter size.

The updated table is:

| Temp | P Oscillator (MHz) 25 C. | N Oscillator (MHz) 25 C. |
|---|---|---|
| TT | 428 | 445 |
| FF | 540 | 531 |
| SS | 346 | 381 |
| SNFP | 535 | 378 |
| FNSP | 342 | 514 |

Figure 3:
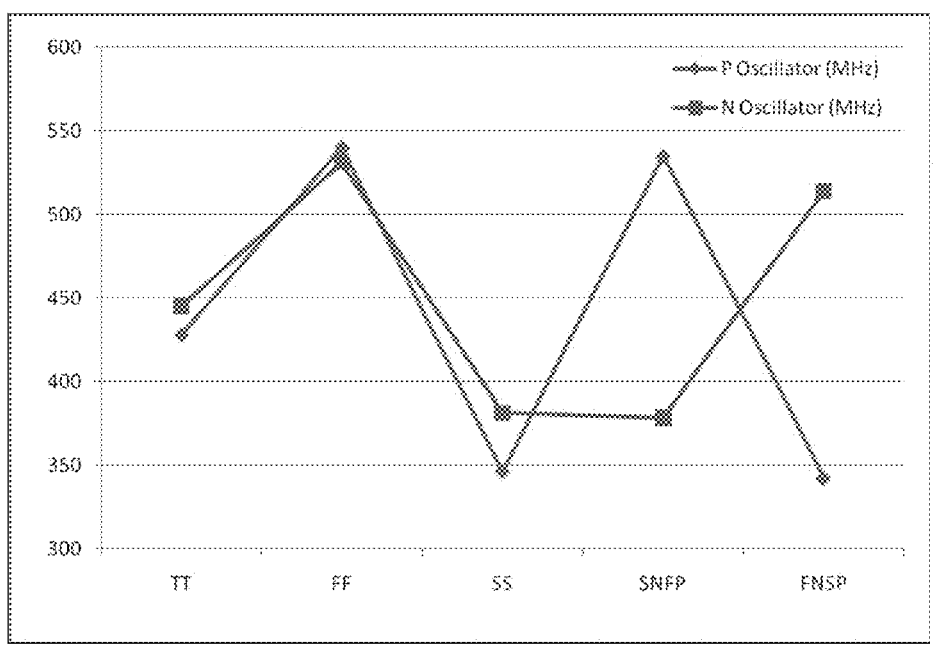
FIG. 3 shows a graph of outputs of P and N oscillators used to determine process corners.

FIG. 3 shows the resulting plot. Limits can be set to determine typical, slow and fast process corners. If the output of the P oscillator falls below 395, it would be considered slow. If it lies between 395 and 491, it would be typical, and if over 492, it would be fast. Similarly, if the N oscillator output falls below 408, it would be considered slow. If it lies between 408 and 490, it would be typical and if over 490 then it would be fast. With this information, the process detection circuit would produce the process corner signal. Referring back to FIG. 2, this would occur at 48.

Either simultaneous with this process, or after the process corner is determined, the temperature sensitive oscillator 14 from FIG. 1 operates at 50 in FIG. 2. The output of the temperature sensitive oscillator is counted at 52. The reference clock from 44 is used to compare the reference count to the temperature sensitive count at 54. This information is then combined with the process corner to determine the operating temperature of the integrated circuit.

Similar to the tables generated for the time insensitive oscillators, the process generates data for the temperature sensitive oscillator such as 14 in FIG. 1. The table shows the frequency (divided by 16) versus temperature for different process corners.

| | Temp | | | | | | |
|---|---|---|---|---|---|---|---|
| | −10 C. | 0 C. | 25 C. | 50 C. | 75 C. | 100 C. | 125 C. |
| TT | 11.08 | 10.90 | 10.49 | 10.08 | 9.69 | 9.33 | 8.98 |
| FF | 12.64 | 12.43 | 11.93 | 11.45 | 10.99 | 10.55 | 10.13 |
| SS | 9.95 | 9.81 | 9.44 | 9.09 | 8.76 | 8.43 | 8.13 |
| SNFP | 11.44 | 11.26 | 10.81 | 10.38 | 9.96 | 9.58 | 9.21 |
| FNSP | 10.84 | 10.68 | 10.28 | 9.91 | 9.54 | 9.20 | 8.86 |

Using the same formula for the 24 MHz reference clock and a 10 bit counter, the table above is recalculated to:

| | Temp | | | | | | |
|---|---|---|---|---|---|---|---|
| | −10 C. | 0 C. | 25 C. | 50 C. | 75 C. | 100 C. | 125 C. |
| TT | 473 | 465 | 447 | 430 | 414 | 398 | 383 |
| FF | 539 | 530 | 509 | 489 | 469 | 450 | 432 |
| SS | 425 | 419 | 403 | 388 | 374 | 360 | 347 |
| SNFP | 488 | 481 | 461 | 443 | 425 | 409 | 393 |
| FNSP | 463 | 456 | 438 | 423 | 407 | 393 | 378 |

Since the PN oscillator is temperature sensitive, or temperature variant, the output across temperature clearly changes. Process corner information allows determination of temperature. For example, looking at TT at 25 C and FF at 100 C in the table above, the outputs of the temperature sensitive oscillator through the counter 20 are 447 and 450 respectively. If the measured output is 450, one uses the process corner information to determine the actual operating temperature. If the process corner is FF and the output is 450, the temperature is 100 C. If the process corner is TT, the temperature is 25 C.

The temperature detection circuit 30 of FIG. 1 may include look up tables organized by process corner, where the process corner signal from the process detection circuit 28 determines which table to use. Alternatively, the process corner and the temperature sensitive oscillator output could be used to index into a two dimensional look up table. The temperature detection circuit may also have logic that determines the operating speed based upon the comparison of the temperature sensitive oscillator, referred to here as the temperature sensitivity signal, to the reference clock.

The look up tables may be programmable, either through registers or read only memories (ROMs) to provide some flexibility in case of a process shift from the foundry. The output of the process and temperature should be looped several times if possible, and an average taken. This allows unexpected glitches in the system or outlying data to exist without affecting the whole system unduly.

In this manner, the process corner and operating temperature of an integrated circuit can be determined. This allows verification of the classification of the integrated circuit as well as allowing verification of the models used at the foundry to produce the integrated circuits. The process uses CMOS logic elements which consume only power during use. The use of standard CMOS logic makes it high yielding and low cost.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A temperature detection circuit on an integrated circuit, comprising:
   a temperature sensitive oscillator;
   at least one temperature insensitive oscillator;
   a reference clock;
   process detection circuitry coupled to an output of the temperature insensitive oscillator and the output of the reference clock, the process detection circuitry to compare the outputs and produce a process corner signal indicating a process corner to which the integrated circuit belongs; and
   temperature reference circuitry coupled to an output of the temperature sensitive oscillator, the output of the reference clock, and the process corner signal, the temperature detection circuitry to produce a temperature for the integrated circuit.

2. The temperature detection circuitry of claim 1, wherein the at least one temperature insensitive oscillator comprises two temperature insensitive oscillators.

3. The temperature detection circuitry of claim 2, wherein the two temperature insensitive oscillators comprise one CMOS P oscillator and one CMOS N oscillator.

4. The temperature detection circuitry of claim 2, wherein the process detection circuitry couples to the output of the two temperature insensitive oscillators through counters.

5. The temperature detection circuitry of claim 1, wherein the temperature sensitive oscillator comprises a CMOS PN oscillator.

6. The temperature detection circuitry of claim 1, wherein the temperature sensitive oscillator couples to the temperature reference circuitry through a counter.

7. The temperature detection circuitry of claim 1, further comprising a voltage regulator coupled to the temperature sensitive oscillator and the temperature insensitive oscillator.

8. The temperature detection circuitry of claim 1, wherein the temperature reference circuitry couples to the reference clock through a counter.

9. The temperature detection circuitry of claim 1, wherein the temperature reference circuitry comprises:
   a comparator to compare the output of the temperature sensitive oscillator and the reference clock to produce a temperature sensitivity signal; and
   a look up table of temperatures, wherein the process corner signal is used to access an appropriate temperature look up table to determine a temperature for the integrated circuit.

10. A method of classifying an integrated circuit, comprising:
    operating at least one temperature insensitive oscillator at a steady state;
    counting an output of the temperature insensitive oscillator to produce a temperature insensitive count;
    counting an output of a reference clock to produce a reference count;
    comparing the reference count to the temperature insensitive count; and
    using the comparison to determine a process corner by which the integrated circuit is classified.

11. The method of claim 10, further comprising operating a temperature sensitive oscillator at a steady state.

12. The method of claim 11, further comprising comparing an output of the temperature sensitive oscillator to the reference clock.

13. The method of claim 10, further comprising using the process corner by which the integrated circuit is classified and the comparison between the temperature sensitive oscillator to the reference clock to determine a temperature for the integrated circuit.

* * * * *